A. HIGLEY.

Car-Trucks.

No. 5,452. Reissued June 17, 1873.

Witnesses.

A. F. Cornell

E. M. Perkins

Inventor:

Aaron Higley.

Per. Burridge & Co.

Attys.

UNITED STATES PATENT OFFICE.

AARON HIGLEY, OF CLEVELAND, OHIO, ASSIGNOR TO HIGLEY CAR-JOURNAL COMPANY.

IMPROVEMENT IN CAR-TRUCKS.

Specification forming part of Letters Patent No. 99,774, dated February 15, 1870; reissue No. 5,452, dated June 17, 1873; application filed December 18, 1872.

*To all whom it may concern:*

Be it known that I, AARON HIGLEY, of Cleveland, Cuyahoga county, State of Ohio, have invented certain Improvements in Railroad-Car Trucks; and I do hereby declare that the following is a full, clear, and exact description thereof, reference being had to the annexed drawings making part of the same.

This invention has for its object the connecting of a railroad-car truck to the car-body, so arranged in relation to each other that the body of the said car when on the truck shall have a longitudinal and transverse freedom of movement, thereby relieving the body of the car from sudden and violent shocks while in motion, in stopping and starting, as hereinafter more fully described. It also has for its object the method of preventing the boxes or pedestals from moving too far out of place in their relation with the frame and axles, and securing of a swing motion by means of an elastic spring which is interposed between the body and truck of the car, one end of said spring being so secured as to move with the body of the car, while the other end of the same spring is controlled by the truck, allowing the body and truck of the car to move one independently of the other, as herein set forth.

Figure 1:
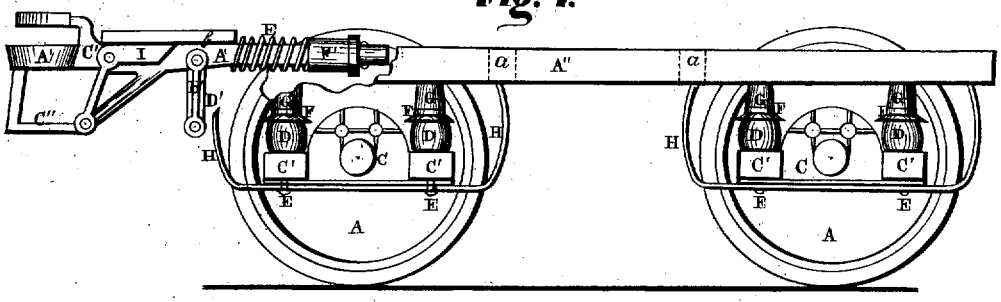
Figure 2:
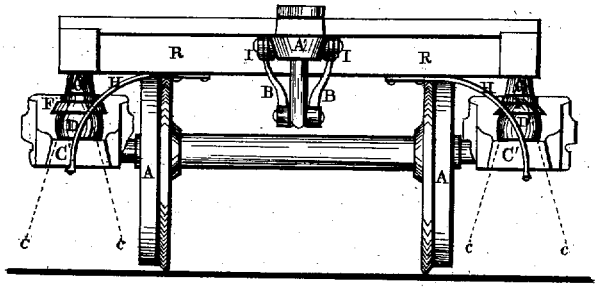
Figure 3:
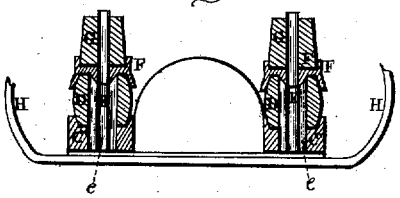
Figure 4:
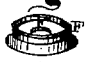

Figure 1 is a side view of a car-truck. Fig. 2 is an end view of the same; Fig. 3, a vertical section of some of the details on an enlarged scale; Fig. 4, a perspective view of the spring-collar on an enlarged scale.

Like letters of reference refer to like parts in the several views.

A represents the wheels of the truck, connected with the axles, on which rests the axle-boxes or housing C. To each end of the boxes C are arms or projections C′, having a recess sunk in the arms or projections C′, in which rests the bottom of spring D. F is a cap or disk resting on the top of the spring D, and having a flange projecting over the top edge of said spring, and a hub projecting into the interior of spring D. On the top of the cap F is placed the spring G on which rests the sill or frame A″ of the car. The top of cap F may or may not have a flange to receive the spring G. E are stay-posts, the top of which are fastened rigidly to the sills of the car; the bottom of said posts, being held at right angles to the sill of the car-body by means of the stay-brace H, which brace is fastened to the lower end of said posts and to the beam or sills of the car-body. The spring G and cap F fit snugly around the posts E, there being play enough, however, to allow them to work up and down easily. In the projection C′ there is a hole through which the post E passes, the hole being enough larger than the post to allow the body of the car to swing freely. Also, in the center of spring D there is a large hole having a space, *e*, between the spring and the post E, as seen in Fig. 3, which allows the post to move with the car-body, said posts being held in the center of the top of spring D by means of the cap F.

It will be observed that the top of the spring D is always held in the same relative position with the body of the car by means of the cap F and the posts E, said posts being rigidly fastened to the car-body. Also, that the bottom of the spring D is always held in the same relative position with the journal-bearing and car-truck by means of the recess in the arms C′, there being space to admit a large amount of play between the post E and the sides of the holes in the arms C′, and in the spring D′, and by means of the elastic nature of the spring D the body of the car and the truck can move one independent of the other. By this arrangement ample lateral play is given to secure an easy and comfortable swing motion to the car-body.

It will be observed that the spring D and the arms C′ of the axle-box, through which the post passes to the stay-brace H, being loosely fitted about the post, will, in consequence, allow the frame A″ or car-body a longitudinal and lateral movement, thereby allowing it to sway gently and easily to the varied end and sidewise movements of the wheels, and thus relieve the car from all violent and sudden shocks while in motion, and in stopping, and starting, and at the same time the elastic nature of the springs gives to the car an easy and gentle support and a spring to its vertical movement. It also permits the car to pass over the curves of the road with more ease and less strain than cars of the usual construction.

What I claim as my invention, and desire to secure by Letters Patent, is—

1. The combination of the springs D G and collar F with the arms C′, stay-brace H, and post E, the several parts constructed and arranged substantially to operate in the manner and for the purpose specified.

2. The cap or collar F, in combination with the springs D and G, as and for the purpose substantially set forth.

3. The combination of the post E, cap F, and spring D, the post being connected rigidly with the brace H and frame A″, substantially as and for the purpose set forth.

Signed and subscribed to this 7th day of December, 1872.

HIGLEY CAR-JOURNAL, CO.,
By AARON HIGLEY, *President.*

Witnesses:
J. H. BURRIDGE,
A. F. CORNELL.